US007596229B2

(12) United States Patent
Croft, III

(10) Patent No.: US 7,596,229 B2
(45) Date of Patent: Sep. 29, 2009

(54) PARAMETRIC AUDIO SYSTEM FOR OPERATION IN A SATURATED AIR MEDIUM

(75) Inventor: James J. Croft, III, Poway, CA (US)

(73) Assignee: American Technology Corporation, San Diego, CA (US)

( * ) Notice: Subject to any disclaimer, the term of this patent is extended or adjusted under 35 U.S.C. 154(b) by 654 days.

(21) Appl. No.: 11/181,363

(22) Filed: Jul. 13, 2005

(65) Prior Publication Data

US 2005/0281413 A1 Dec. 22, 2005

Related U.S. Application Data

(63) Continuation-in-part of application No. 09/384,084, filed on Aug. 26, 1999, now Pat. No. 6,584,205.

(60) Provisional application No. 60/588,129, filed on Jul. 14, 2004.

(51) Int. Cl.
*H04B 3/00* (2006.01)

(52) U.S. Cl. .................................................... 381/77

(58) Field of Classification Search .................. 381/77, 381/79, 150, 190, 191, 111, 75, 82, 83, 96, 381/103; 367/140

See application file for complete search history.

(56) References Cited

U.S. PATENT DOCUMENTS

| | | | | |
|---|---|---|---|---|
| 3,825,834 | A | 7/1974 | Stuart et al. | |
| 4,149,031 | A | 4/1979 | Cooper | |
| 4,418,404 | A | 11/1983 | Gordon et al. | |
| 4,823,908 | A * | 4/1989 | Tanaka et al. | 181/175 |
| 4,991,687 | A | 2/1991 | Oyaba et al. | |
| 5,406,634 | A | 4/1995 | Anderson et al. | |
| 5,582,176 | A | 12/1996 | Swerling et al. | |
| 5,859,915 | A * | 1/1999 | Norris | 381/75 |
| 5,889,870 | A * | 3/1999 | Norris | 381/77 |
| 6,584,205 | B1 * | 6/2003 | Croft et al. | 381/98 |
| 6,606,389 | B1 | 8/2003 | Selfridge et al. | |
| 7,162,042 | B2 | 1/2007 | Spencer et al. | |

OTHER PUBLICATIONS

Moffett et al., "Model for Parametric Acoustic Sources," J. Acoust. Soc. Am., Feb. 1977, vol. 61, No. 2.

Willette et al. "Harmonics of the Difference Frequency in Saturation-Limited Parametric Sources," J. Acoust. Soc. A.m., Dec. 1977, vol. 62, No. 6.

Aoki et al. "Parametric Loudspeaker—Characteristics of Acoustic Field and Suitable Modulation of Carrier Ultrasound," Electronics and Communications in Japan, Part 3, 1991, vol. 74, No. 9.

(Continued)

*Primary Examiner*—Vivian Chin
*Assistant Examiner*—Lun-See Lao
(74) *Attorney, Agent, or Firm*—Thorpe North & Western LLP

(57) ABSTRACT

A parametric loudspeaker system and method for reducing distortion in a decoupled audio wave by creating a double sideband parametric ultrasonic signal that substantially approximates a non-square-rooted modulation envelope and emitting a parametric ultrasonic wave that corresponds to the double sideband parametric ultrasonic signal from a parametric loudspeaker at a sufficient amplitude to drive the surrounding air into saturation.

17 Claims, 12 Drawing Sheets

OTHER PUBLICATIONS

Yoneyama et al. "The audio spotlight: An application of nonlinear interaction of sound waves to a new type of loudspeaker design," J. Acoust. Soc. Am., May 1983, vol. 73 No. (5).

Kamakura et al. "Development of parametric loudspeaker for practical use: 10$^{th}$ International Symposium on Non-linear Acoustics" Department of Electrical Engineering, Nagoya university Japan, 1984, pp. 147-150.

Berktay, H.O., "possible exploitation of non-linear acoustics in underwater transmitting applications" Journal of Sound Vib1965, pp. 435-461, vol. 2, No. 4.

Kamakura et al. "Suitable modulation of the carrier ultrasound for a parametric loudspeaker" Acustica 1991, pp. 215-217. vol. 73.

Kite et al. "parametric array in air; distortion reduction by preprocessing" (2 pages).

Kite et al. "parametric array in air; distortion reduction by preprocessing" (11 pages).

Pompei "the use of airborne ultrasonics for generating audible sound beams" Journal of Audio Engineering Society, Presented at the 105$^{th}$ Convention 1998, California.

* cited by examiner

PARAMETRIC AUDIO SYSTEM FOR OPERATION IN A SATURATED AIR MEDIUM

Priority of U.S. Provisional patent application Ser. No. 60/588,129 filed on Jul. 14, 2004 is claimed. Priority of U.S. Provisional patent application Ser. No. 60/513,804 is claimed. This is a Continuation-in-Part of U.S. patent application Ser. No. 09/384,084 filed Aug. 26, 1999 now U.S. Pat. No. 6,584,205.

BACKGROUND OF THE INVENTION

1. Field of the Invention

The present invention relates generally to the field of parametric loudspeakers. More particularly, this invention relates to the operation of parametric loudspeakers in a saturated air medium, or above and below saturation levels in the air medium while maintaining significantly reduced distortion.

2. Related Art

Audio reproduction has long been considered a well-developed technology. Over the decades, sound reproduction devices have moved from a mechanical needle on a tube or vinyl disk, to analog and digital reproduction over laser and many other forms of electronic media. Advanced computers and software now allow complex programming of signal processing and manipulation of synthesized sounds to create new dimensions of listening experience, including applications within movie and home theater systems. Computer generated audio is reaching new heights, creating sounds that are no longer limited to reality, but extend into the creative realms of imagination.

Nevertheless, the actual reproduction of sound at the interface of electro-mechanical speakers with the air has remained substantially the same in principle for almost one hundred years. Such speaker technology is clearly dominated by dynamic speakers, which constitute more than 90 percent of commercial speakers in use today. Indeed, the general class of audio reproduction devices referred to as dynamic speakers began with the simple combination of a magnet, voice coil and cone, driven by an electronic signal. The magnet and voice coil convert the variable voltage of the signal to mechanical displacement, representing a first stage within the dynamic speaker as a conventional multistage transducer. The attached cone provides a second stage of impedance matching between the electrical transducer and air envelope surrounding the transducer, enabling transmission of small vibrations of the voice coil to emerge as expansive compression waves that can fill an auditorium. Such multistage systems comprise the current fundamental approach to reproduction of sound, particularly at high energy levels.

A lesser category of speakers, referred to generally as film or diaphragmatic transducers, relies on movement of an emitter surface area of film that is typically generated by electrostatic or planar magnetic driver members. Although electrostatic speakers have been an integral part of the audio community for many decades, their popularity has been quite limited. Typically, such film emitters are known to be low-power output devices having limited applications. With a few exceptions, commercial film transducers have found primary acceptance as tweeters and other high frequency devices in which the width of the film emitter is equal to or less than the propagated wavelength of sound. Attempts to apply larger film devices have resulted in poor matching of resonant frequencies of the emitter with sound output, as well as a myriad of mechanical control problems such as maintenance of uniform spacing from the stator or driver, uniform application of electromotive fields, phase matching, frequency equalization, etc.

As with many well-developed technologies, advances in the state of the art of sound reproduction have generally been limited to minor enhancements and improvements within the basic fields of dynamic and electrostatic systems. Indeed, substantially all of these improvements operate within the same fundamental principles that have formed the basics of well-known audio reproduction. These include the concept that (i) sound is generated at a speaker face, (ii) based on reciprocating movement of a transducer (iii) at frequencies that directly stimulate the air into the desired audio vibrations. From this basic concept stems the myriad of speaker solutions addressing innumerable problems relating to the challenge of optimizing the transfer of energy from a dense speaker mass to the almost massless air medium that must propagate the sound.

A second fundamental principle common to prior art dynamic and electrostatic transducers is the fact that sound reproduction is based on a linear mode of operation. In other words, the physics of conventional sound generation rely on mathematics that conform to linear relationships between absorbed energy and the resulting wave propagation in the air medium. Such characteristics enable predictable processing of audio signals, with an expectation that a given energy input applied to a circuit or signal will yield a corresponding, proportional output when propagated as a sound wave from the transducer.

In such conventional systems, maintaining the air medium in a linear mode is extremely important. If the air is driven excessively into a nonlinear state, severe distortion occurs and the audio system is essentially unacceptable. This nonlinearity occurs when the air molecules adjacent the dynamic speaker cone or emitter diaphragm surface are driven to excessive energy levels that exceed the ability of the air molecules to respond in a corresponding manner to speaker movement. In simple terms, when the air molecules are unable to match the movement of the speaker so that the speaker is loading the air with more energy than the air can dissipate in a linear mode, then a nonlinear response occurs, leading to severe distortion and speaker inoperability. Conventional sound systems are therefore built to avoid this limitation, ensuring that the speaker transducer operates strictly within a linear range.

Parametric sound systems, however, represent an anomaly in audio sound generation. Instead of operating within the conventional linear mode, parametric sound can only be generated when the air medium is driven into a nonlinear state. Within this unique realm of operation, audio sound is not propagated from the speaker or transducer element. Instead, the transducer is used to propagate carrier waves of high-energy, ultrasonic bandwidth beyond human hearing. The ultrasonic wave therefore functions as the carrier wave, which can be modulated with audio input that develops sideband characteristics capable of decoupling in air when driven to the nonlinear condition. In this manner, it is the air molecules and not the speaker transducer that will generate the audio component of a parametric system. Specifically, it is the sideband component of the ultrasonic carrier wave that energizes the air molecule with audio signal, enabling eventual wave propagation at audio frequencies.

Another fundamental distinction of a parametric speaker system from that of conventional audio is that high-energy transducers as characterized in prior art audio systems do not appear to provide the necessary energy required for effective parametric speaker operation. For example, the dominant dynamic speaker category of conventional audio systems is well known for its high-energy output. Clearly, the capability of a cone/magnet transducer to transfer high-energy levels to surrounding air is evident from the fact that virtually all high-power audio speaker systems currently in use rely on dynamic speaker devices. In contrast, low output devices such as electrostatic and other diaphragm transducers are virtually unacceptable for high-power requirements. As an obvious example, consider the outdoor audio systems that service large concerts at stadiums and other outdoor venues. Normally, massive dynamic speakers are necessary to develop direct audio to such audiences. To suggest that a low-power film diaphragm might be applied in this setting would be considered foolish and impractical.

In summary, whereas conventional audio systems rely on well accepted acoustic principles of (i) generating audio waves at the face of the speaker transducer, (ii) based on a high-energy output device such as a dynamic speaker, (iii) while operating in a linear mode, the present inventors have discovered that just the opposite design criteria are preferred for parametric applications. Specifically, effective parametric sound is effectively generated using (i) a comparatively low-energy emitter, (ii) in a nonlinear mode, (iii) to propagate an ultrasonic carrier wave with a modulated sideband component that is decoupled in air (iv) at extended distances from the face of the transducer. In view of these distinctions, it is not surprising that much of the conventional wisdom developed over decades of research in conventional audio technology is simply inapplicable to problems associated with the generation parametric sound.

Despite developments in parametric sound, two main problems remain. First, is that parametric loudspeakers have historically only been capable of producing limited acoustic output. While it is clear that greater signal levels are needed, designers have historically limited the levels at which parametric speakers are driven in order to avoid driving the surrounding air medium into saturation. Saturation occurs where the air molecules are driven to such a high level of intensity, that they no longer accurately respond to the vibrations of the emitter. In prior parametric speakers, air saturation was avoided because high levels of distortion would typically result. Instead, parametric loudspeakers have required larger diameter, higher cost emitters to avoid saturating the air medium. While higher acoustic outputs and lower cost, smaller emitters are desirable in a parametric loudspeaker, these features have thus far been largely unattainable.

The second problem that still plagues parametric sound is that of reducing distortion levels at higher output levels. Based on the prior art Berktay solution, a reproduced audio frequency input signal should be distortion free where the signal has been square rooted before passing through double sideband AM modulation.

When the square-root processing is applied, testing by the inventors has shown that distortion is reduced only when the ultrasound level is small, and can increase dramatically with the ultrasound intensity. These data show that the prior art Berktay, square root preprocessing solution cannot effectively reduce distortion with high levels of ultrasound pressure. Furthermore, the square-root preprocessing method is not valid for a wide range of ultrasonic amplitudes, and particularly not valid for the higher intensity outputs required for improved parametric sound pressure levels. Finally, to perfectly reproduce the Berktay solution, an infinite number of terms are required, which is impractical to implement. It has been found that with square-root preprocessing, THD (Total Harmonic Distortion) can range between a few percent to as high as 50 percent or more as levels increase.

Accordingly, it would be an improvement over the current state of the art to provide a system of minimized size requirements that can provide higher acoustic output levels, while maintaining low distortion levels at all output levels.

SUMMARY OF THE INVENTION

It has been recognized that it would be advantageous to develop a parametric loudspeaker that is capable of producing high acoustic output levels while maintaining minimized size requirements and maintaining low distortion levels. In particular, it would be advantageous to develop a parametric loudspeaker that is capable of operating in a saturated air medium while maintaining low distortion levels.

The invention provides a parametric method and loudspeaker system for operating in a saturated air medium. An ultrasonic carrier signal and an audio input signal are modulated by a parametric modulator preprocessor to produce a parametric ultrasonic signal. The amplitude of the parametric ultrasonic signal is sufficient to continuously maintain operation of the parametric loudspeaker system in the saturated medium. An electro-acoustical emitter is coupled to the parametric modulator preprocessor for emitting a parametric ultrasonic wave at an amplitude sufficient to continuously maintain operation of the parametric loudspeaker system in the saturated medium. Numerous variations of this embodiment are also provided.

The invention further provides a method and parametric loudspeaker system for operating in both a non-saturated air medium and a saturated air medium. The system includes an ultrasonic carrier signal source and an audio input signal source for providing an ultrasonic carrier signal and an audio input signal. A signal processor is coupled to the ultrasonic carrier and audio input signal sources. The signal processor operates in a first predetermined signal processing mode when the parametric loudspeaker is operating in the non-saturated air medium. The signal processor operates in a second predetermined signal processing mode when the parametric loudspeaker is operating in the saturated air medium for creating a double sideband parametric ultrasonic signal. An electro-acoustical emitter, which is coupled to the signal processor, emits a parametric ultrasonic wave into the surrounding air. Numerous variations of this embodiment are also provided.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1A:
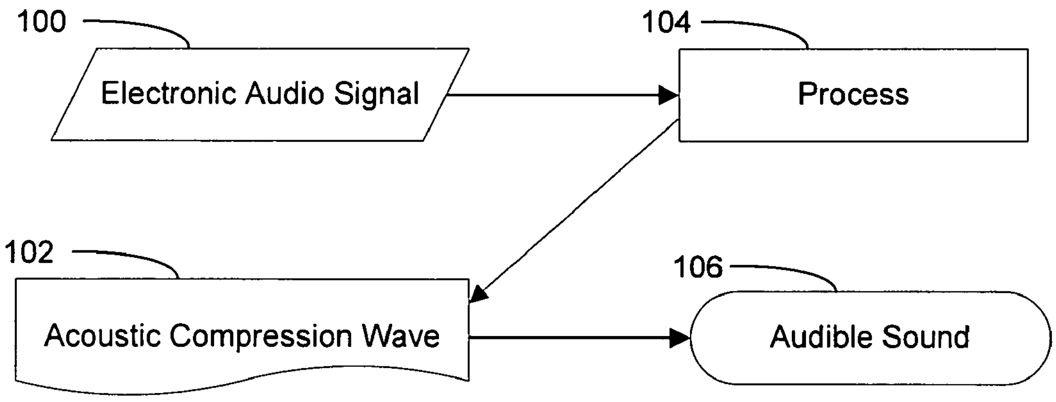
FIG. 1*a* is a reference diagram for FIGS. 1*b* and 1*c*.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Because parametric sound is a relatively new and developing field, and in order to identify the distinctions between parametric sound and conventional audio systems, the following definitions, along with explanatory diagrams, are provided. While the following definitions may also be employed in future applications from the present inventor, the definitions are not meant to retroactively narrow or define past applications or patents from the present inventors, their associates, or assignees.

Figure 1B:
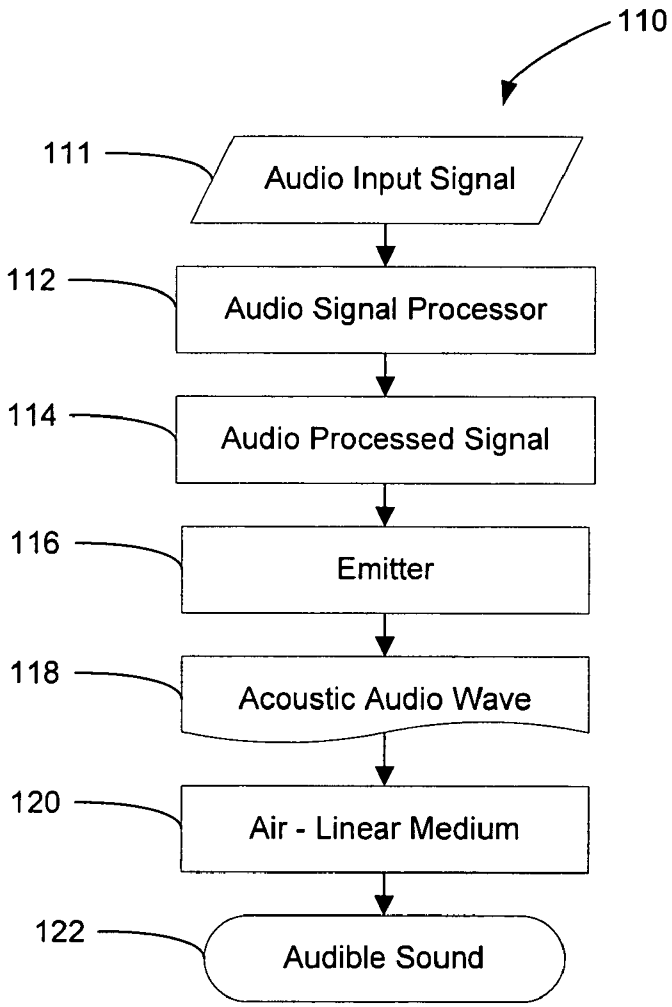
FIG. 1*b* is a block diagram of a conventional audio system.
Figure 1C:
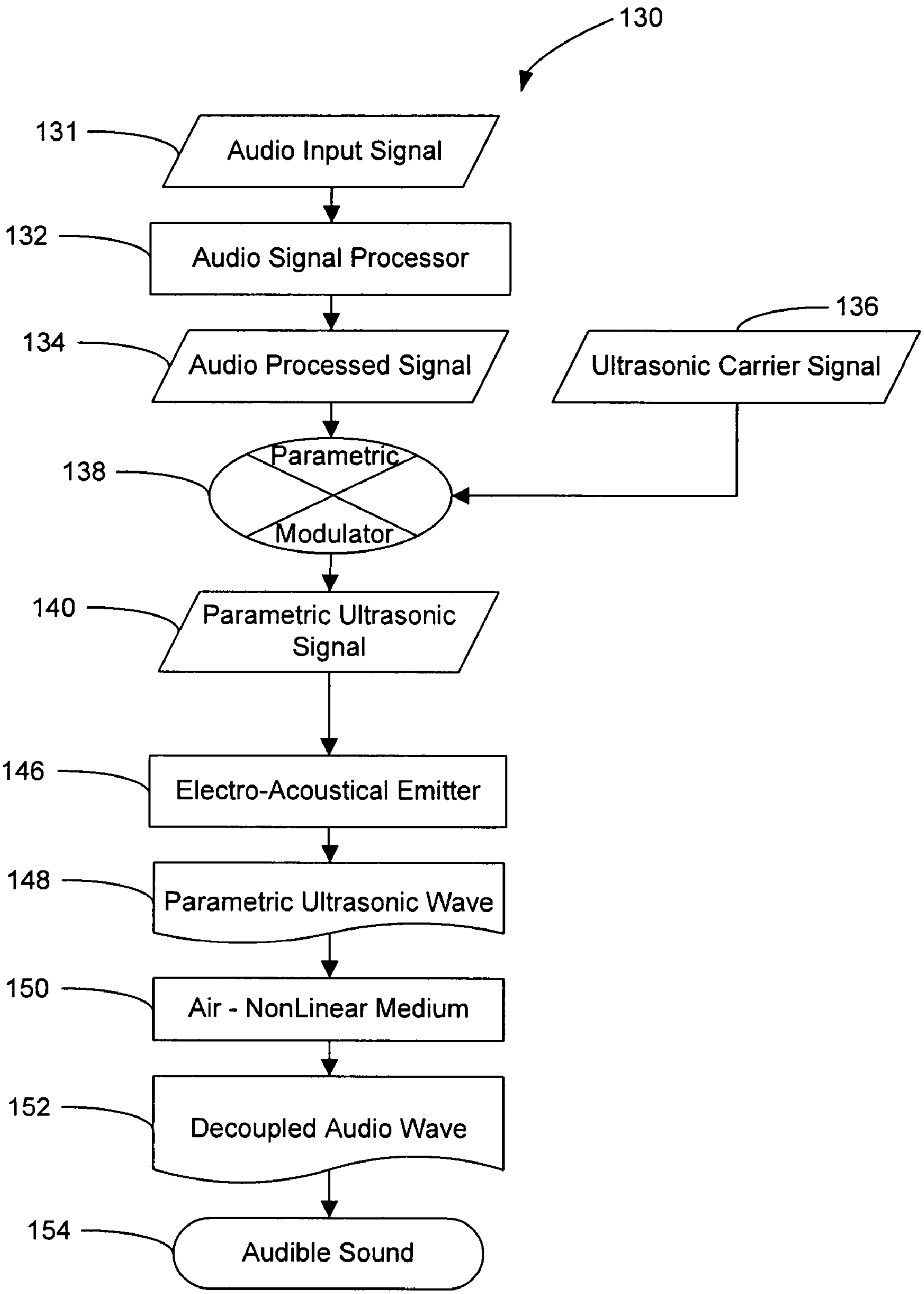
FIG. 1*c* is flow diagram illustrating the complexities of a parametric audio system, and defining the terminology of a parametric audio system.

FIG. 1*a* serves the purpose of establishing the meanings that will be attached to various block diagram shapes in FIGS. 1*b* and 1*c*. The block labeled 100 will represent any electronic audio signal. Block 100 will be used whether the audio signal corresponds to a sonic signal, an ultrasonic signal, or a parametric ultrasonic signal. Throughout this application, any time the word 'signal' is used, it refers to an electronic representation of an audio component, as opposed to an acoustic compression wave.

The block labeled 102 will represent any acoustic compression wave. As opposed to an audio signal, which is in electronic form, an acoustic compression wave is propagated into the air. The block 102 representing acoustic compression waves will be used whether the compression wave corresponds to a sonic wave, an ultrasonic wave, or a parametric ultrasonic wave. Throughout this application, any time the word 'wave' is used, it refers to an acoustic compression wave which is propagated into the air.

The block labeled 104 will represent any process that changes or affects the audio signal or wave passing through the process. The audio passing through the process may either be an electronic audio signal or an acoustic compression wave. The process may either be a manufactured process, such as a signal processor or an emitter, or a natural process such as an air medium.

The block labeled 106 will represent the actual audible sound that results from an acoustic compression wave. Examples of audible sound may be the sound heard in the ear of a user, or the sound sensed by a microphone.

FIG. 1*b* is a flow diagram 110 of a conventional audio system. In a conventional audio system, an audio input signal 111 is supplied which is an electronic representation of the audio wave being reproduced. The audio input signal 111 may optionally pass through an audio signal processor 112. The audio signal processor is usually limited to linear processing, such as the amplification of certain frequencies and attenuation of others. Very rarely, the audio signal processor 112 may apply non-linear processing to the audio input signal 111 in order to adjust for non-linear distortion that may be directly introduced by the emitter 116. If the audio signal processor 112 is used, it produces an audio processed signal 114.

The audio processed signal 114 or the audio input signal 111 (if the audio signal processor 112 is not used) is then emitted from the emitter 116. As discussed in the section labeled 'related art', conventional sound systems typically employ dynamic speakers as their emitter source. Dynamic speakers are typically comprised of a simple combination of a magnet, voice coil and cone. The magnet and voice coil convert the variable voltage of the audio processed signal 114 to mechanical displacement, representing a first stage within the dynamic speaker as a conventional multistage transducer. The attached cone provides a second stage of impedance matching between the electrical transducer and air envelope surrounding the emitter 116, enabling transmission of small vibrations of the voice coil to emerge as expansive acoustic audio wave 118. The acoustic audio wave 118 proceeds to travel through the air 120, with the air substantially serving as a linear medium. Finally, the acoustic audio wave reaches the ear of a listener, who hears audible sound 122.

FIG. 1*c* is a flow diagram 130 that clearly highlights the complexity of a parametric sound system as compared to the conventional audio system of FIG. 1*b*. The parametric sound system also begins with an audio input signal 131. The audio input signal 131 may optionally pass through an audio signal processor 132.

The audio processed signal 134 or the audio input signal 131 (if the audio signal processor 132 is not used) is then parametrically modulated with an ultrasonic carrier signal 136 using a parametric modulator 138. The ultrasonic carrier signal 136 may be supplied by any ultrasonic signal source. While the ultrasonic carrier signal 136 is normally fixed at a constant ultrasonic frequency, it is possible to have an ultrasonic carrier signal that varies in frequency. The parametric modulator 138 is configured to produce a parametric ultrasonic signal 140, which is comprised of an ultrasonic carrier signal, which is normally fixed at a constant frequency, and at least one sideband signal, wherein the sideband signal frequencies vary such that the difference between the sideband signal frequencies and the ultrasonic carrier signal frequency are the same frequency as the audio input signal 131. The parametric modulator 138 may be configured to produce a parametric ultrasonic signal 140 that either contains one sideband signal (single sideband modulation, or SSB), or both upper and lower sidebands (double sideband modulation, or DSB).

The parametric ultrasonic signal 140 is then emitted from the emitter 146, producing a parametric ultrasonic wave 148 which is propagated into the air 150. The parametric ultrasonic wave 148 is comprised of an ultrasonic carrier wave and at least one sideband wave. The parametric ultrasonic wave 148 drives the air into a substantially non-linear state. Because the air serves as a non-linear medium, acoustic heterodyning occurs on the parametric ultrasonic wave 148, causing the ultrasonic carrier wave and the at least one sideband wave to decouple in air, producing a decoupled audio wave 152 whose frequency is the difference between the ultrasonic carrier wave frequency and the sideband wave frequencies. Finally, the decoupled audio wave 152 reaches the ear of a listener, who hears audible sound 154. The end goal of parametric audio systems is for the decoupled audio wave 152 to closely correspond to the original audio input signal 131, such that the audible sound 154 is 'pure sound', or the exact representation of the audio input signal. However, because of limitations in parametric loudspeaker technology, including the difficulty of producing a decoupled audio wave 152 having significant intensity over a wide band of audio frequencies, attempts to produce 'pure sound' with parametric loudspeakers have been largely unsuccessful. The above process describing parametric audio systems is thus far substantially known in the prior art.

The above system has previously been operated such that the surrounding air is driven into non-linearity, while attempting to avoid driving the air into saturation. The present invention introduces an apparatus and method for increasing acoustic output levels by operating the parametric speaker in a saturated air medium, while maintaining minimized distortion levels. The invention includes a method for reducing distortion in a decoupled audio wave by emitting a DSB parametric ultrasonic wave from a parametric loudspeaker system into a saturated air medium.

Figure 2:
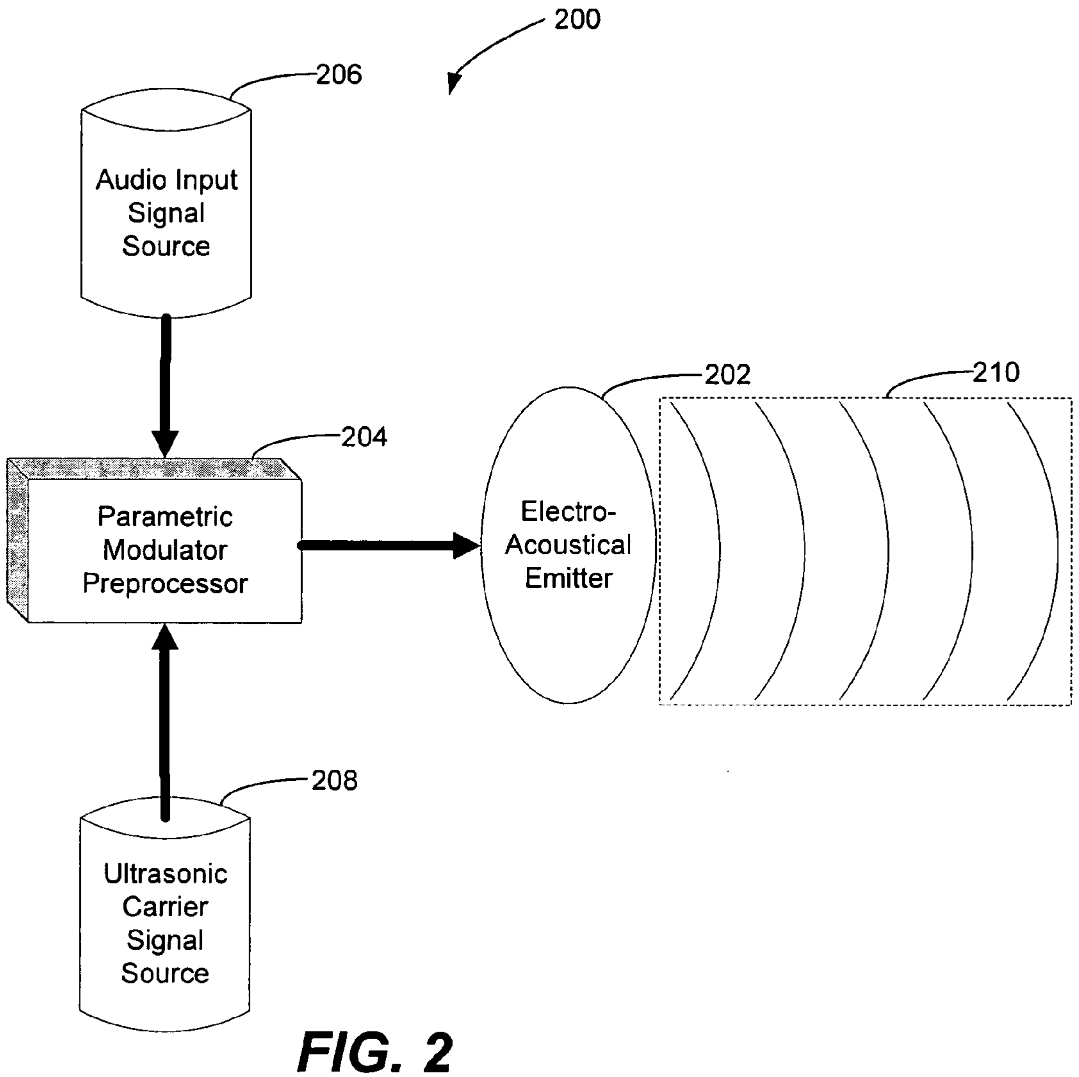
FIG. 2 is a block diagram of a parametric loudspeaker system for operating in a saturated air medium, in accordance with one embodiment of the invention.

In accordance with the present invention, FIG. 2 provides a block diagram of a parametric loudspeaker system 200 for operating in a saturated air medium 210. The system 200 includes an ultrasonic carrier signal source 208 for providing an ultrasonic carrier signal. The system further includes an audio input signal source 206 for providing an audio input signal. The parametric loudspeaker system 200 may also include a parametric modulator preprocessor 204 which is coupled to the ultrasonic carrier signal source 208 and the audio input signal source 206. The parametric modulator preprocessor 204 parametrically modulates the ultrasonic carrier signal with the audio input signal to produce a DSB parametric ultrasonic signal having an amplitude sufficient to continuously maintain continuously drive the surround air 210 into saturation. The parametric loudspeaker system 200 may also include an electro-acoustical emitter 202 coupled to the parametric modulator preprocessor 204 for emitting a parametric ultrasonic wave at an amplitude sufficient to continuously drive the surrounding air 210 into saturation.

The present inventors have discovered that if the above system 200 is employed to drive the surrounding air into saturation using a DSB parametric ultrasonic signal, distortion can be kept to a minimum even while operating in saturation mode. Prior systems have been largely incapable of operating in saturation while maintaining low distortion. The reason is likely because prior systems have ordinarily employed the Berktay square-rooting solution to compensate for Berktay's prediction that the resulting decoupled audio wave along the axis of the beam is proportional to the second time derivative of the square of the amplitude modulation envelope. However, the present inventors have discovered that Berktay's prediction does not hold true when air is driven into saturation. Instead, when air is driven into saturation, the squared terms disappear, and the square of the amplitude modulation envelope is no longer necessary. Therefore, as long as the surrounding air medium is being driven into saturation, the non-square rooted waveform can be DSB amplitude modulated, and emitted into the air, and low distortion will be maintained. Although prior systems may occasionally drive the surrounding air into saturation, the benefit of low distortion was usually not obtained, because the systems were normally employing the Berktay square-rooting technique even when operating in saturation. Furthermore, even when the prior systems did drive the surrounding air into saturation, it was normally considered an undesirable result of an abnormal peak in audio levels. Far from being an undesirable result, the current embodiment of the present invention actually has the purpose of continually driving the surrounding air into saturation, and obtains high efficiency and low distortion by doing so.

Figure 3A:
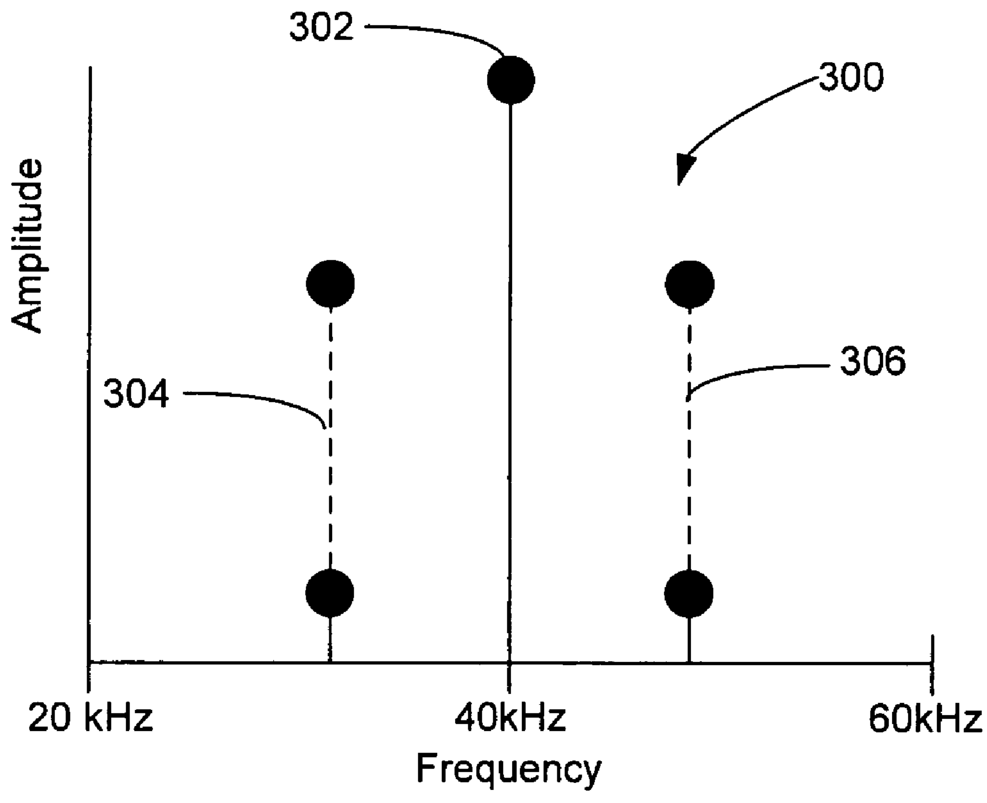
FIG. 3*a* is a plot of the modulation index of an ultrasonic parametric signal having a constant ultrasonic carrier signal level for continually driving the surrounding air into saturation.

Numerous variations to the system 200 can be made without deviating from the scope of the invention. For example, as illustrated in FIG. 3*a*, the parametric modulator preprocessor 204 may create the parametric ultrasonic signal having an ultrasonic carrier signal 302 fixed at a constant amplitude. The amplitude of the ultrasonic carrier signal 302 is set at a level sufficient to continuously maintain the surrounding air medium 210 in the saturated state. The sideband signals 304 and 306 are free to increase and decrease, as indicated by the dotted lines (304 and 306), depending on the level of the audio input signal, but the overall level of the parametric ultrasonic signal is continuously sufficient to maintain the surrounding air medium 210 in the saturated state.

Figure 3B:
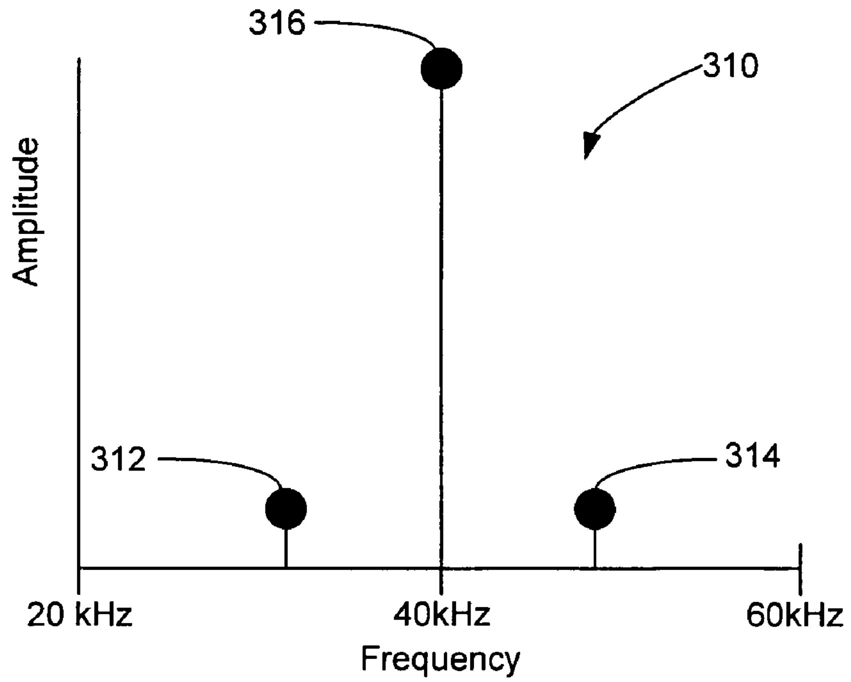
FIGS. 3*b* and 3*c* are plots of the modulation index of an ultrasonic parametric signal, wherein a dynamic carrier is employed to maintain the surrounding air medium in a saturated state.
Figure 3C:
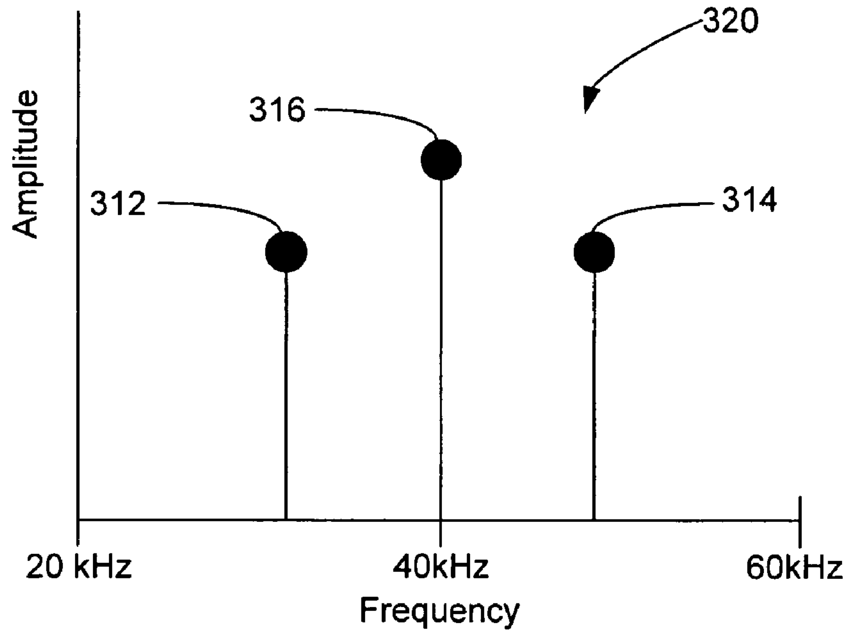

In another variation, illustrated in FIGS. 3*b* and 3*c*, the parametric modulator preprocessor 204 is configured to create the parametric ultrasonic signal having at least one sideband signal 312 and 314 that increases in amplitude upon an increase in the audio input signal, and decreases in amplitude upon a decrease in the audio input signal. In one embodiment, a DSB, shown in FIGS. 3*b* and 3*c*, parametric ultrasonic signal is created. While the sidebands may increase and decrease in level, overall amplitude of the parametric ultrasonic wave to maintain saturation of the surrounding air medium 210. The parametric modulator preprocessor may also be configured to create the parametric ultrasonic signal having an ultrasonic carrier signal 316 that decreases in amplitude as the audio input signal increases, and increases in amplitude as the audio input signal decreases. By comparing FIG. 3*b* to FIG. 3*c*, it is evident that when the sidebands 312 and 314 are at a low amplitude, as shown in FIG. 3*b*, the carrier signal 316 is at a high amplitude. When the sidebands 312 and 314 are at a high amplitude, as shown in FIG. 3*c*, the carrier signal 316 is at a decreased amplitude. Because the sideband signal levels 312 and 314 are increasing as the ultrasonic carrier signal 316 decreases, and because the sideband signal levels are decreasing as the ultrasonic carrier signal increases, the overall amplitude of the parametric ultrasonic wave is always sufficient to maintain saturation of the surrounding air medium 210. This embodiment has the benefit of greater efficiency than the embodiment of FIG. 3*a*. While the embodiment of FIG. 3*a* requires continuous high power at the carrier frequency irregardless of the level of the sidebands, the embodiment of FIGS. 3*b* and 3*c* may employ a dynamic carrier to ensure that the minimum necessary power is being used to ensure that the surrounding air 210 is driven into saturation.

Figure 3D:
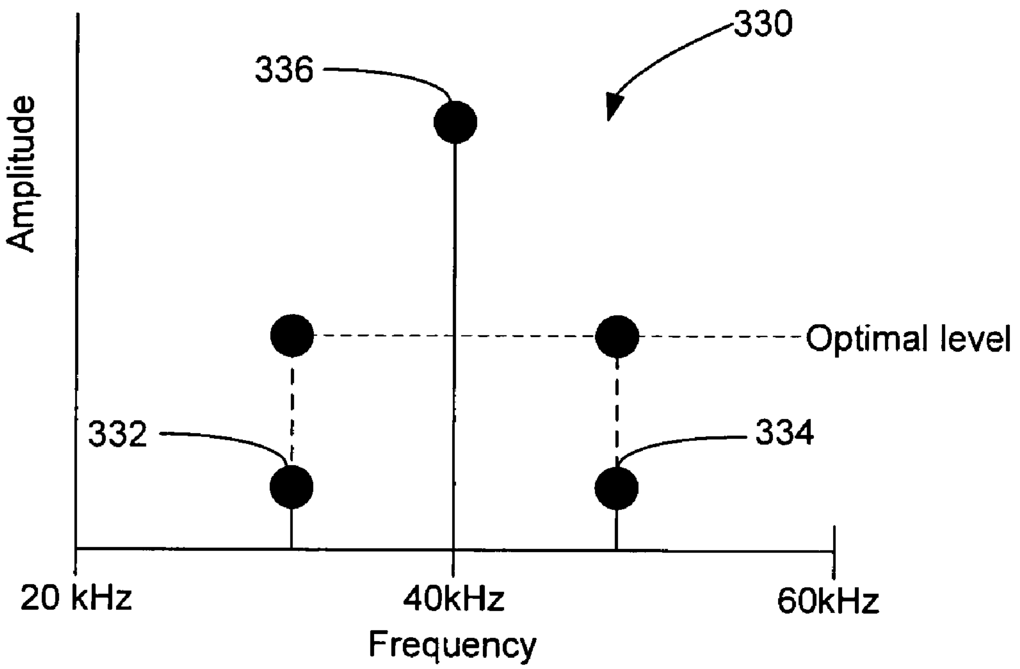
FIG. 3*d* is a plot of the modulation index of an ultrasonic parametric signal, wherein a modulation index of one is reached when a maximum audio input signal level is received.

In another variation, illustrated in FIG. 3*d*, the parametric modulator preprocessor 204 is configured such that when the input signal is received at its maximum level, the sidebands 332 and 334 will raise to the level that will create a parametric ultrasonic signal having a modulation index at an optimal level. The modulation index may be optimized at a level at or near one, meaning that the sum of the amplitudes of the sideband signals is equal to the amplitude of the carrier signal. The example in FIG. 3*d* is an illustration of a parametric ultrasonic signal having a modulation index of approximately one.

With all of the above embodiments where the air is continuously driven into saturation, a major benefit is achieved over the majority of prior parametric loudspeakers. Parametric loudspeakers have historically purposely avoided driving the air into saturation, thereby decreasing their acoustic output levels in exchange for minimizing distortion levels. Parametric loudspeakers have largely been left to either choose a high modulation index yielding high efficiency, or low modulation index yielding low distortion. However, both high efficiency and low distortion was largely unobtainable, because as soon as the modulation index was raised to a high level to obtain high efficiency, the distortion levels would increase. If the modulation index were dropped to a lower level to decrease distortion levels, the efficiency level also dropped. Conversely, the present invention can obtain both high efficiency and low distortion. This is obtained by purposefully driving the air into saturation, thereby dramatically increasing output levels, while maintaining minimized distortion. Furthermore, the size requirement of the parametric loudspeaker system is maintained at a minimum, because a large emitter is no longer needed to avoid driving the surrounding air into saturation.

Figure 4:
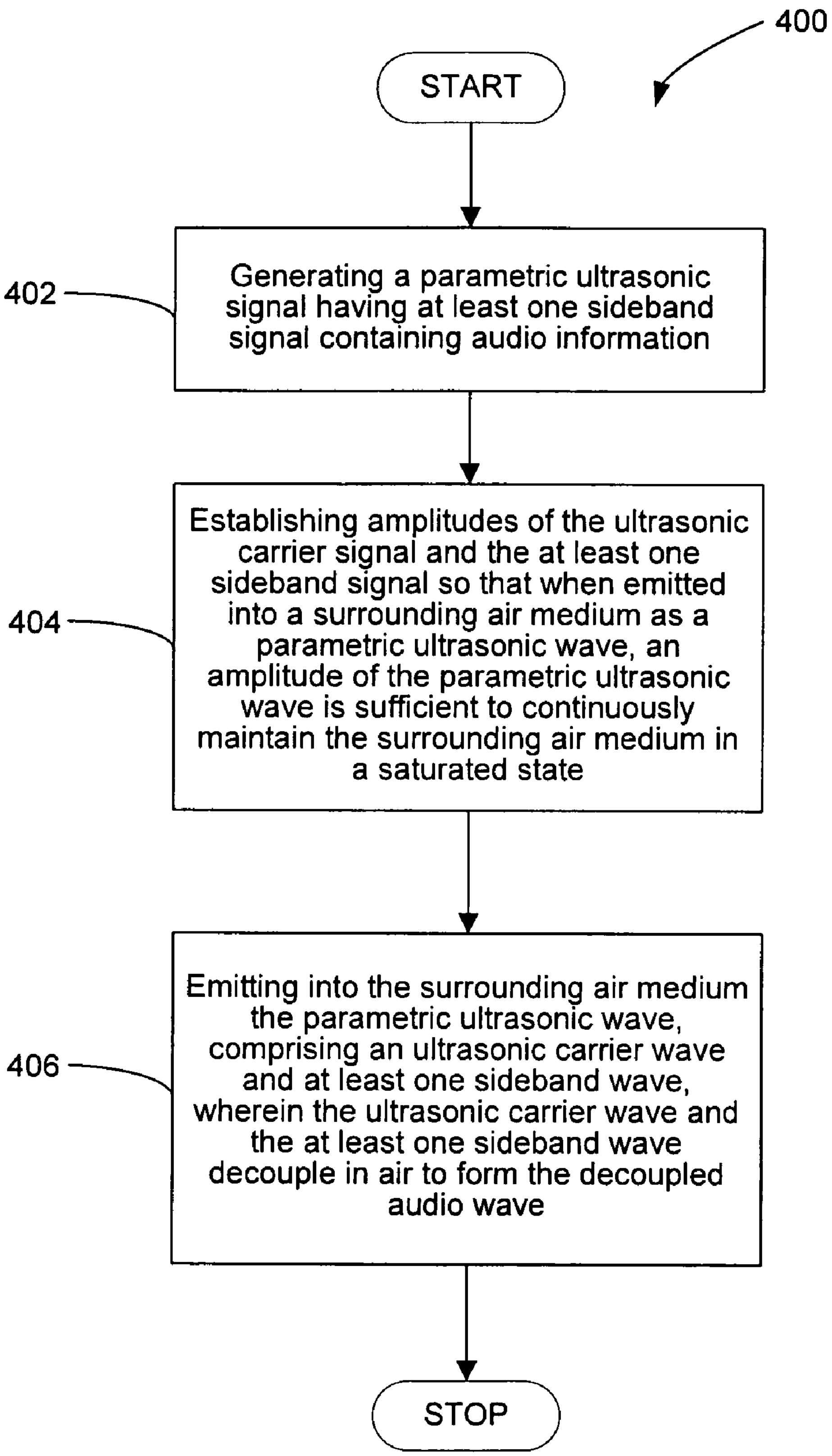
FIG. 4 is a flow diagram illustrating a method used for operating a parametric loudspeaker system in a saturated air medium to produce a decoupled audio wave.

As illustrated in FIG. 4, a method 400, in accordance with the present invention, is shown for operating a parametric loudspeaker system in a saturated air medium to produce a decoupled audio wave. The method 400 may include generating 402 a parametric ultrasonic signal having at least one sideband signal containing audio information. In one embodiment, a DSB parametric ultrasonic signal is generated. The method 400 may further include establishing 404 amplitudes of the ultrasonic carrier signal and the at least one sideband signal so that when emitted into a surrounding air medium as a parametric ultrasonic wave, an amplitude of the parametric ultrasonic wave is sufficient to continuously maintain the surrounding air medium in a saturated state. The method 400 may further include emitting into the surrounding air medium the parametric ultrasonic wave, comprising an ultrasonic carrier wave and at least one sideband wave, wherein the ultrasonic carrier wave and the at least one sideband wave decouple in air to form the decoupled audio wave. Method 400 would normally not create the parametric ultrasonic signal from a square-rooted audio input signal. The decoupled audio wave that results maintains a lower distortion level than had the modulation envelope of the parametric ultrasonic signal been square-rooted.

Method 400 may also include the additional step of further adjusting linear parameters of the parametric ultrasonic signal to compensate for errors in a linear response of acoustic output of the electro-acoustical emitter such that when the parametric ultrasonic signal is emitted, the parametric ultrasonic wave is propagated, having an acoustic modulation index that is optimized. Here, the "acoustic modulation index" refers to the modulation index of the parametric ultrasonic wave that is actually propagated into the air, as opposed to the "electrical modulation index", which refers to the modulation index of the electronic parametric ultrasonic signal. The acoustical modulation index often differs from the electrical modulation index due to various parameters of the acoustic output of the electro-acoustical emitter, such as the frequency response of the emitter. Therefore, the acoustic modulation index of the parametric ultrasonic wave that actually reaches the listener may be different than the modulation index that was intended to be produced. This method compensates for the linear response of the acoustic output such that the acoustic modulation index is optimized.

Method 400 may also include the additional step of further adjusting linear parameters of the parametric ultrasonic signal to compensate for a linear response of the parametric loudspeaker system such that when the parametric ultrasonic signal is emitted from the parametric loudspeaker system, the parametric ultrasonic wave is propagated, having sidebands that are more closely matched at least at a predefined point in space over at least one sideband frequency range. U.S. patent application No. 60/513,804 is hereby incorporated by reference to describe the above procedures.

The linear response of the acoustic output that is compensated for may be a function of physical characteristics of the parametric loudspeaker system, such as the frequency response, and an environmental medium wherein the parametric ultrasonic wave is propagated. For example, the environmental medium may attenuate certain frequencies more rapidly than other frequencies. The linear parameters that are adjusted to compensate for the linear response of the acoustic output may include the amplitude of the signal, directivity of the propagated wave, time delays of the signal, and the phase of the signal.

For example, if the parametric loudspeaker had a frequency response that attenuated the sidebands at a faster rate than the carrier frequency, the above method may create an electronic modulation index of 1.25, such that when the propagated parametric ultrasonic wave reaches the listener, it will have an acoustic modulation index of 1. Additionally, the frequency response of nearly all loudspeakers (including parametric loudspeakers) tend to attenuate one sideband at a higher rate than the other sideband. Therefore, the emitted parametric ultrasonic wave will have upper and lower sidebands that are no longer matched. The above method may create a parametric ultrasonic signal wherein the amplitudes of the sideband signals have been altered to compensate for the unequal sideband attenuation of the loudspeaker. Therefore, the emitted parametric ultrasonic wave will have sidebands that are substantially matched.

Figure 5:
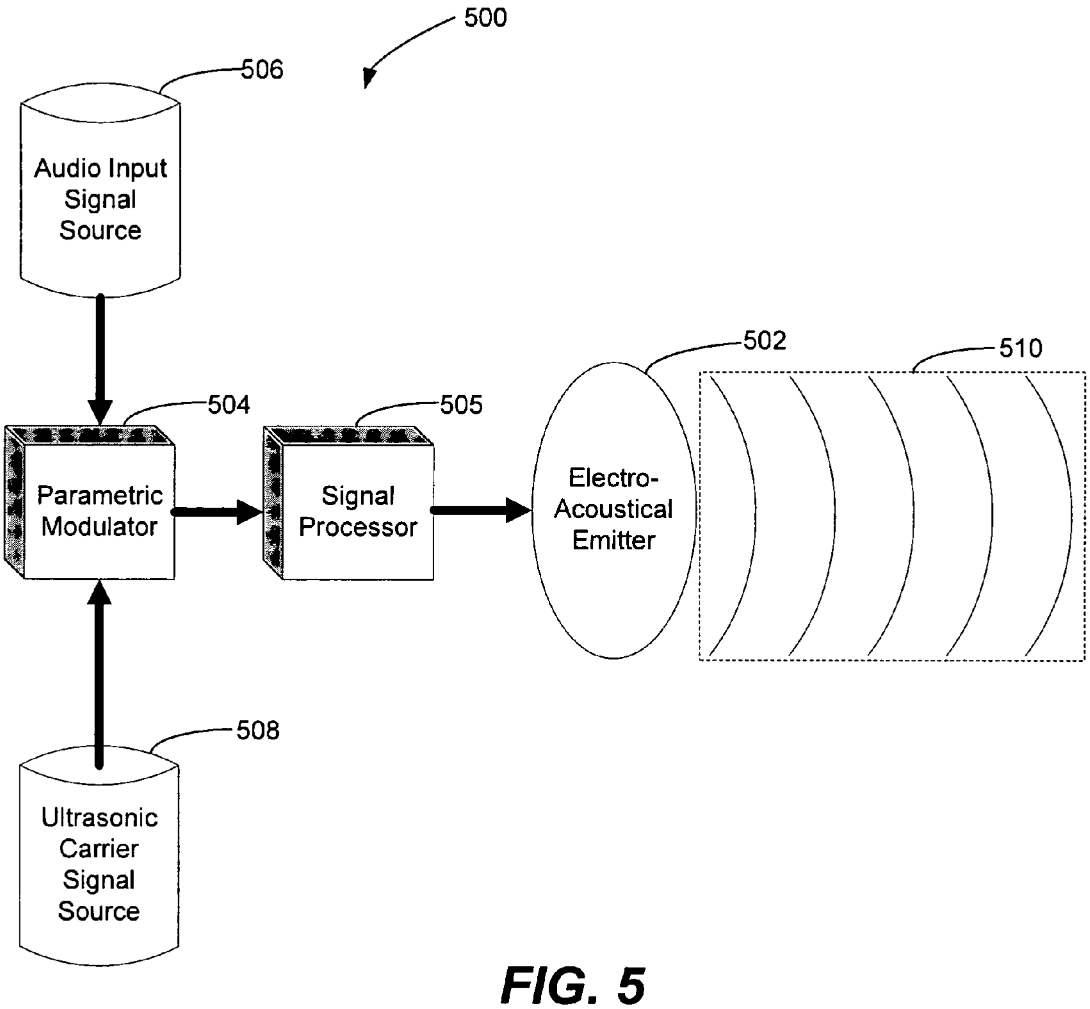
FIG. 5 is a block diagram of a parametric loudspeaker system for operating in both a saturated air medium and a non-saturated air medium, in accordance with one embodiment of the invention.

In another embodiment of the present invention, illustrated in FIG. 5, a parametric loudspeaker system 500 is disclosed for operating in both a non-saturated air medium and a saturated air medium. The system 500 includes an ultrasonic carrier signal source 508 coupled for providing an ultrasonic carrier signal. The system 500 also includes an audio input signal source 506 for providing an audio input signal. The audio input signal may either be a single frequency tone, or be a complex audio input signal comprised of multiple frequency tones. A signal processor 505 is coupled to the ultrasonic carrier and audio input signal sources 506 and 508. An electro-acoustical emitter 502 is coupled to the signal processor 505 for emitting a parametric ultrasonic wave 510. The system 500 may also include a parametric modulator 504, coupled to the audio input and ultrasonic carrier signal sources 506 and 508 for parametrically modulating the ultrasonic carrier signal with the audio input signal to produce a parametric ultrasonic signal. The parametric modulator 504 and the signal processor 505 may be integrated into a single device.

The signal processor 505 is configured to operate in a first predetermined signal processing mode whenever the parametric loudspeaker is operating at an amplitude and frequency that do not drive the surrounding air into saturation. The signal processor 505 is configured to operate in a second predetermined signal processing mode whenever the parametric loudspeaker is driving the surrounding air into saturation. While numerous variations can be made to the first predetermined signal processing mode, the second predetermined signal processing mode fundamentally creates a DSB parametric ultrasonic signal. Slight variations can also be made to the second predetermined signal processing mode, while still fundamentally creating a DSB parametric ultrasonic signal.

Figure 6A:
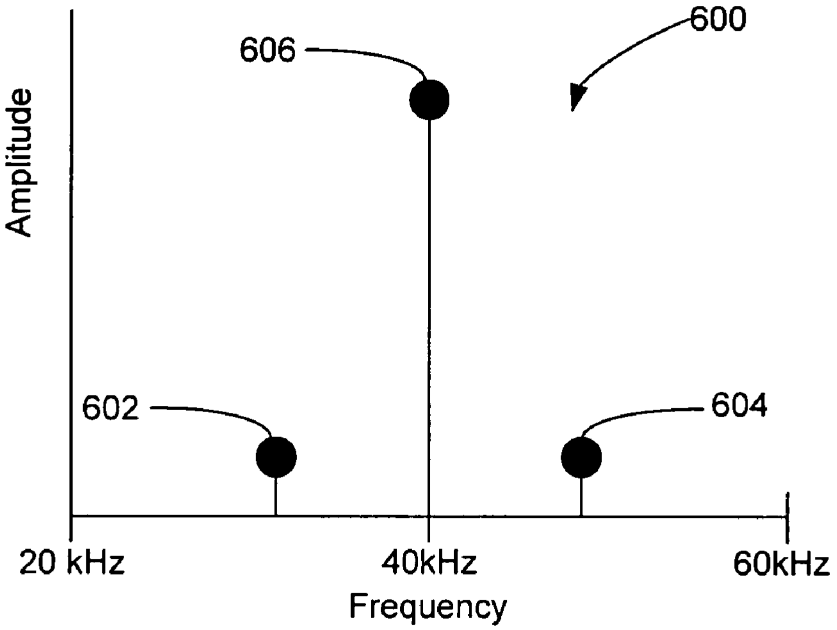
FIGS. 6*a* and 6*b* are plots illustrating one embodiment where the modulation index of the parametric ultrasonic signal is lower when operating in the non-saturated air mode, and is higher when operating in the saturated air mode.
Figure 6B:
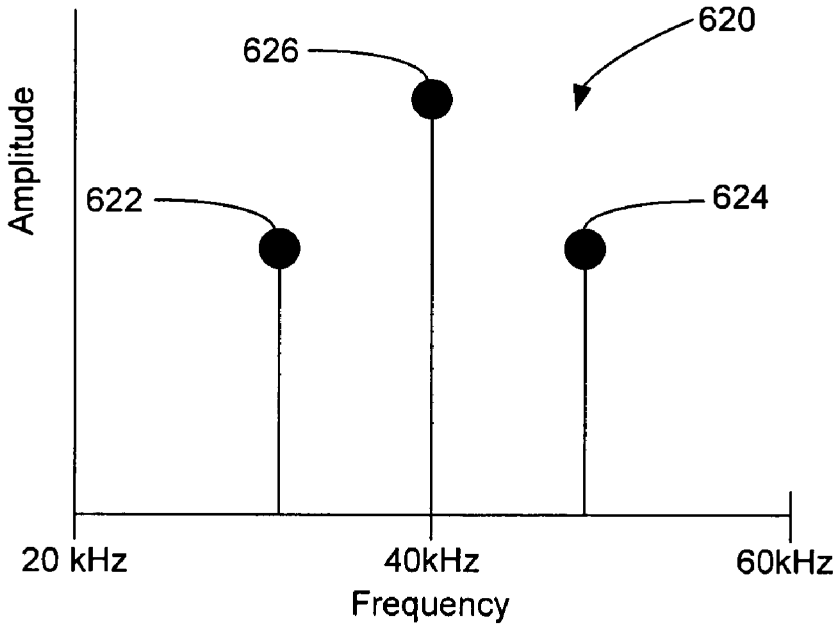

In one embodiment, the first predetermined signal processing mode creates a DSB parametric ultrasonic signal having a low modulation index, as illustrated in FIG. 6*a*. The second predetermined signal processing mode creates a DSB parametric ultrasonic signal having a higher modulation index than the parametric ultrasonic signal created by the first mode, as illustrated in FIG. 6*b*. By emitting a parametric ultrasonic wave having a low modulation index while the air is not being driven into saturation, much of the distortion that commonly results from emitting a DSB signal into a non-saturated air medium is avoided. Although a low modulation index sacrifices efficiency, this sacrifice is not overly detrimental because the system may be configured such that only low level signals are reproduced when the air is in non-saturation, and therefore, high efficiency levels are not needed. When the air is driven into saturation, and the second predetermined signal processing mode is engaged, a DSB parametric ultrasonic wave may be emitted having a high modulation index with little or no distortion.

Figure 7:
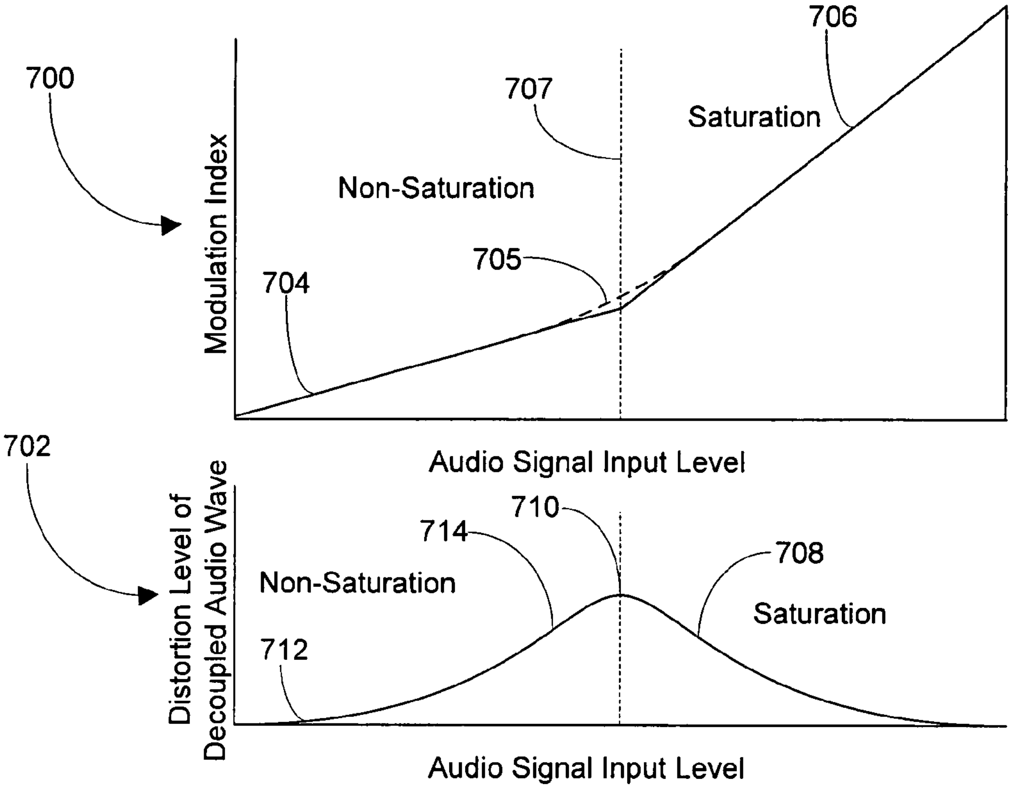
FIG. 7 is a plot illustrating one embodiment where the modulation index of the parametric ultrasonic signal is artificially increased when the system is operating in a saturated air medium. This increase in modulation index may also correspond to a decrease in distortion level of the decoupled audio wave.

In one variation of the above embodiment, the modulation index of the DSB parametric ultrasonic signal is artificially increased when the parametric loudspeaker system operates above the audio input signal level 707 that drives the surrounding air into saturation. As illustrated in FIG. 7, plot 700, while operating in the non-saturation mode, the first predetermined signal processing mode gradually increases the modulation index 704 as the audio input level increases. This gradual increase may be due to the natural rise in modulation index that occurs when an increase in audio input signal level causes the sideband levels to increases. When the audio input reaches a sufficient level such that the emitted parametric ultrasonic wave drives the surrounding air into saturation (707), the second predetermined signal processing mode artificially increases the modulation index 706 of the DSB parametric ultrasonic signal such that as the air is driven deeper into saturation, the signal is created at a higher modulation index level than what would have occurred had the second predetermined signal processing mode been engaged. As the modulation index is increased, the system becomes more efficient. Optionally, when the system is operating in the transition region between the non-saturated air medium and the saturated air medium, the artificially increase may be gradual, as illustrated with the dotted line 705, thereby creating a smoother transition between the non-saturated mode of operation and the saturated mode of operation.

In a further variation of the above embodiment, the point at which the modulation index of the DSB parametric ultrasonic signal begins to be artificially increased may correspond to the point at which an increase in the amplitude of the audio input signal results in a decrease in the distortion level of the decoupled audio wave. This principal is illustrated jointly by the 700 and 702 plots. When the audio input signal level is quite low, the modulation index of the parametric ultrasonic signal is also low (704), and the overall distortion level in the resultant decoupled audio wave is also low (712) because the sidebands are low enough that high levels of distortion in the decoupled audio wave are avoided. As the audio input signal level increases, the resultant increase in the modulation index level causes an increase in the distortion level of the decoupled audio wave (714). When the audio input signal reaches the level which begins to drive the surrounding air into saturation (707 and 710), the level of distortion in the decoupled audio wave naturally begins to decrease. When the air is saturated, the modulation index can be increased 706, which causes the air to be driven deeper into saturation, thereby causing the level of distortion to decrease even more 708. Furthermore, the high modulation index while operating in a saturated air medium creates a very efficient system. Although the modulation index is lower while operating in the non-saturated air medium, the lower resultant efficiency is not a significant detriment, since the corresponding lower audio input signal is also low, and therefore, high power levels are largely unnecessary. The system may be configured such that the maximum allowable level of distortion 710 is always less then a predetermined value. For example, the system may be configured such that the distortion level at 710 is always less than 5%.

Figure 8:
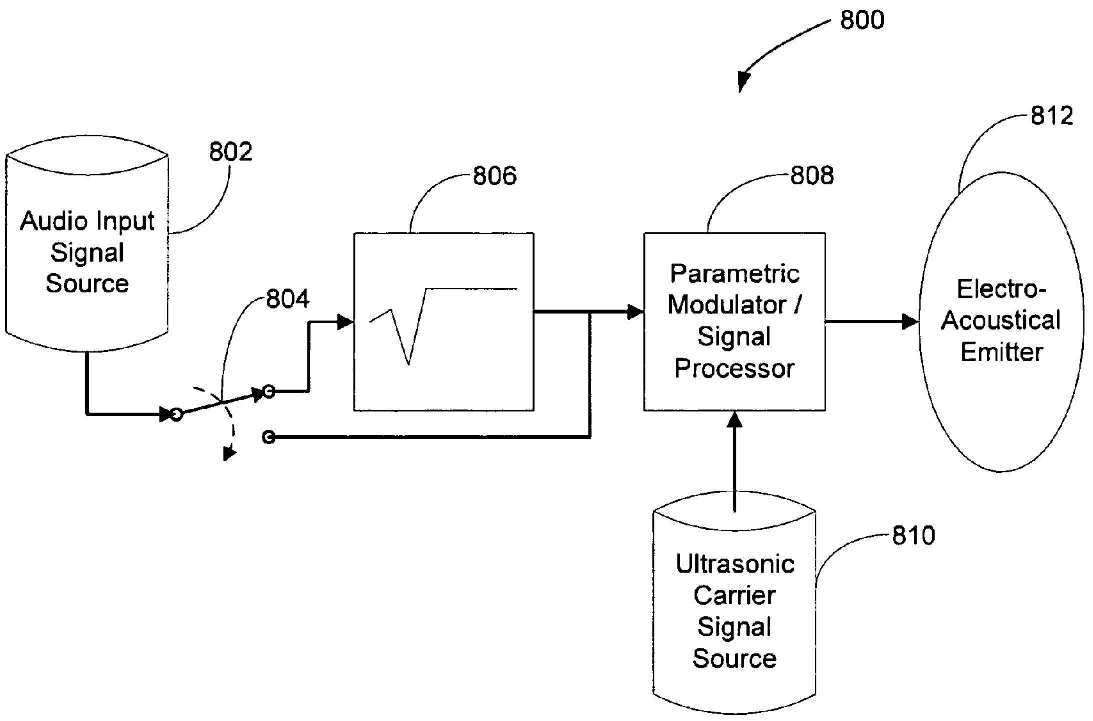
FIG. 8 is a block diagram illustrating a square rooting technique that is only used when the parametric loudspeaker system is operating in the non-saturated mode, in accordance with one embodiment of the invention.

In another variation of the system of FIG. 5, the first predetermined signal processing mode is configured to create the double sideband parametric ultrasonic signal from a preprocessed square-rooted audio input signal. The second predetermined signal processing mode is configured to create the double sideband parametric ultrasonic signal from a non-square-rooted audio input signal. FIG. 8, is a simplified diagram of this embodiment, although it is not intended to describe the only implementation of the embodiment. When the switch 804 is in the up position, the system 800 is operating in the first predetermined signal processing mode, where the audio input signal source 802 is square rooted 806 prior to being parametrically modulated with the ultrasonic carrier signal 810 to create a DSB parametric ultrasonic signal. When the switch 804 is in the down position, the system 800 is operating in the second predetermined signal processing mode, and the parametric modulator 808 creates a non-square-rooted DSB parametric ultrasonic signal. This embodiment is effective for reducing distortion and increasing efficiency, because while the parametric loudspeaker is operating in the non-saturated mode, perhaps because the audio input signal is at a low level, the Berktay square-rooting solution is utilized for reducing distortion. Note that the Berktay square-rooting solution is theoretically still valid while the parametric loudspeaker is operating in non-saturated mode. While the parametric loudspeaker is operating in the saturated mode, perhaps because the audio input signal is at a higher level, the square-rooting solution is not utilized because the Berktay square-rooting solution is no longer effective for reducing distortion. Low distortion can be achieved in saturation without square rooting the input signal.

In another variation of the system of FIG. 5, the first predetermined signal processing mode is configured to produce the DSB parametric ultrasonic signal, wherein a modulation envelope of the DSB parametric ultrasonic signal substantially matches an amplitude modulated version of a square-rooted audio input signal. The second predetermined signal processing mode is configured to produce the DSB parametric ultrasonic signal wherein the modulation envelope substantially matches an amplitude modulated version of a non-square-rooted audio input signal. Note that a key distinction between the present variation and the previous variation is that here, it does not matter whether or not the audio input signal is actually being square-rooted. Instead, various techniques may be used such that the DSB parametric ultrasonic signal substantially matches an amplitude modulated version of the non-square-rooted audio input signal, or substantially matches an amplitude modulated version of the non-square-rooted audio input signal. One such technique includes recursively adjusting the modulation envelope until the modulation envelope substantially matches an amplitude modulated version of a square-rooted audio input signal. By substantially matching the modulation envelope of the DSB parametric ultrasonic signal to an amplitude modulated version of the square-rooted audio input signal through a recursive error correction process, the Berktay problem of requiring an infinite number of terms to accurately reproduce the sound wave is avoided. U.S. application Ser. No. 09/384,084 is hereby incorporated by reference to fully describe this recursive process.

The above square-rooting embodiments may further include changing gradually from the first predetermined signal processing mode, where the first predetermined signal processing mode is one of the square-rooting modes, to the second predetermined signal processing mode, where the second predetermined signal processing mode is one of the non-square-rooting modes, as the parametric loudspeaker transitions from operating in the non-saturated air medium to operating in the saturated air medium.

Various techniques may be employed during the transition from non-saturated to saturated operation. For example, in one embodiment, the audio input signal ($S_{in}$) is raised to the power N ($S_{in}^{N}$) prior to being parametrically modulated to produce the parametric ultrasonic signal. While operating in the first predetermined signal processing mode, N=½, thereby square-rooting $S_{in}$. As the parametric loudspeaker gradually changes from the first to the second predetermined signal processing mode, N gradually changes from ½ to 1.

In another embodiment, the audio input signal ($S_{in}$) is multiplied by a number N prior to being parametrically modulated, and the result is raised to the ½ power:

$$(S_{in}*N)^{1/2}$$

N approximately equals one while operating in the first predetermined signal processing mode, and gradually changes until fully operating in the second predetermined signal processing mode, where:

$$(S_{in}*N)^{1/2} \approx S_{in}$$

In other words, although a square-rooting function is being performed in both the first and the second predetermined signal processing modes, the second predetermined signal processing mode is still configured such that the DSB parametric ultrasonic signal is produced wherein the modulation envelope substantially matches an amplitude modulated version of a non-square-rooted audio input signal.

The above mentioned techniques used for transitioning from the first predetermined signal processing mode to the second predetermined signal processing mode are merely given by way of example, and many other transitioning techniques can be devised by one of ordinary skill in the art. The mere use of a first and a second processing mode for operating in non-saturated and saturated air mediums, with or without employing a gradual transition technique between the two processing modes, is sufficient to fall within the scope of the present embodiment.

In another embodiment of the invention, a parametric loudspeaker system is disclosed for operating in both a non-saturated air medium and a saturated air medium. The system includes ultrasonic carrier and audio input signal sources for providing an ultrasonic carrier signal and an audio input signal. A parametric modulator is coupled to the ultrasonic carrier and audio input signal sources. The parametric modulator modulates the ultrasonic carrier signal with the audio input signal to produce a DSB parametric ultrasonic signal having a predetermined modulation index value. The system also includes a parametric ultrasonic signal processor coupled to the parametric modulator, configured to artificially increase the modulation index when the audio input signal exceeds a predetermined level. An electro-acoustical emitter is coupled to the parametric ultrasonic signal processor for emitting a parametric ultrasonic wave into a surrounding air medium.

The system may be configured to begin to artificially increase the modulation index when the audio input exceeds a level which causes the surrounding air medium to enter into saturation. The level of the audio input which causes the surrounding air to enter into saturation may further correspond to a decrease in the distortion level of the decoupled audio wave. This principle was illustrated in FIG. 7. The system may further be configured to maintain the distortion of the decoupled audio wave below a predetermined maximum level. For example, the predetermined maximum distortion level in the decoupled audio wave may be 5%, or 3%.

Figure 9:
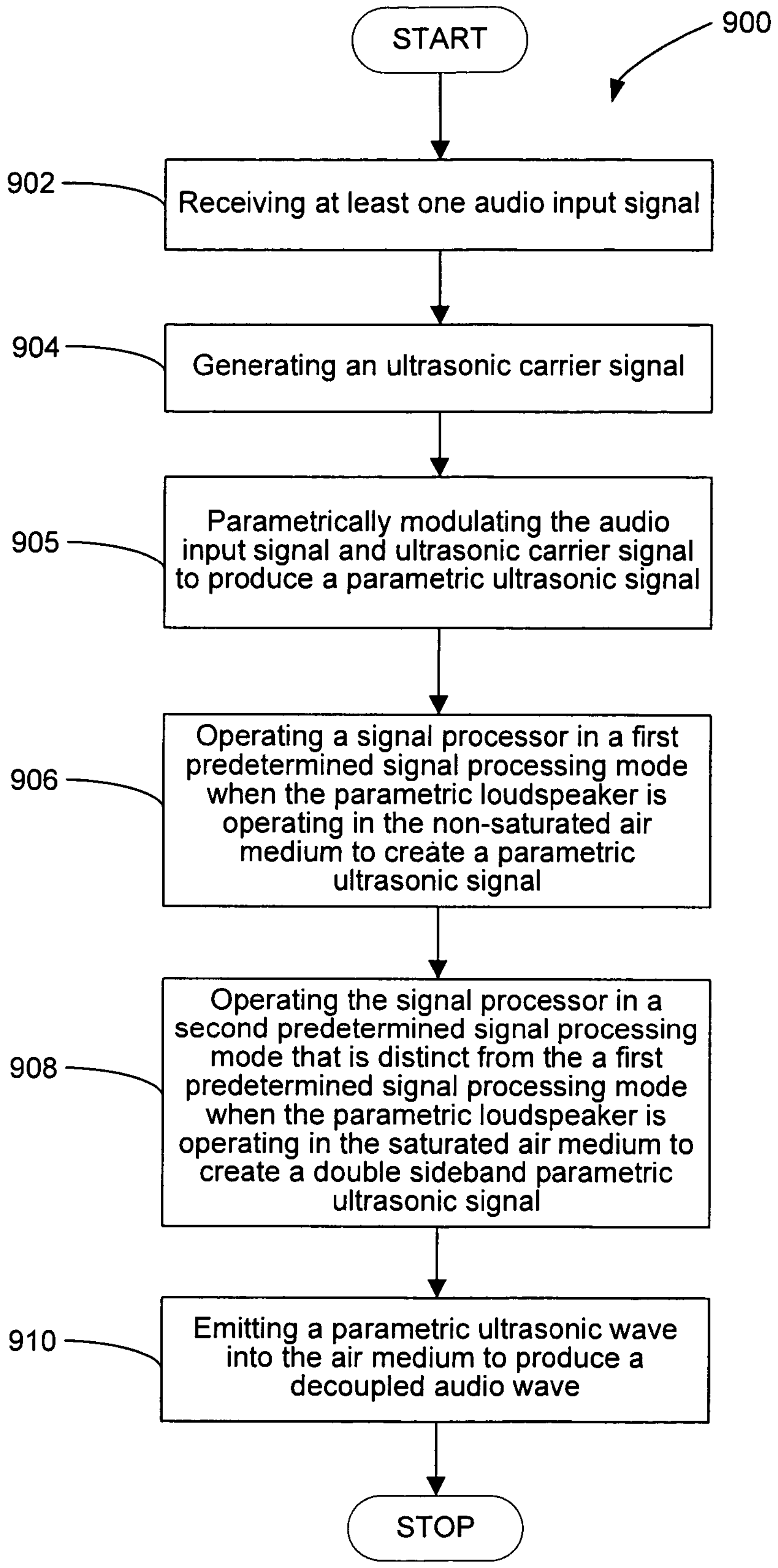
FIG. 9 is a flow diagram illustrating a method used for operating a parametric loudspeaker system in both a non-saturated air medium and a saturated air medium

As illustrated in FIG. 9, a method 900, in accordance with the present invention, is shown for operating a parametric loudspeaker system in both a non-saturated air medium and a saturated air medium. The method 900 may include receiving 902 at least one audio input signal. The method 900 may further include generating 904 an ultrasonic carrier signal. The method may further include parametrically modulating 905 the audio input signal and ultrasonic carrier signal to produce a parametric ultrasonic signal. The method 900 may further include operating 906 a signal processor in a first predetermined signal processing mode when the parametric loudspeaker is operating in the non-saturated air medium to create a parametric ultrasonic signal. The method 900 may further include operating 908 the signal processor in a second predetermined signal processing mode that is distinct from the first predetermined signal processing mode when the parametric loudspeaker is operating in the saturated air medium to create a double sideband parametric ultrasonic signal. The method 900 may further include emitting 910 a parametric ultrasonic wave into the air medium to produce a decoupled audio wave.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments of the invention. It will be apparent to those of ordinary skill in the art that numerous modifications can be made without departing from the principles and concepts of the invention as set forth in the examples.

The invention claimed is:

1. A method for operating a parametric loudspeaker system in both a non-saturated air medium and a saturated air medium, comprising:

a) receiving at least one audio input signal;

b) generating an ultrasonic carrier signal;

c) parametrically modulating the audio input signal and ultrasonic carrier signal to produce a parametric ultrasonic signal;

d) operating a signal processor in a first predetermined signal processing mode when the parametric loudspeaker is operating in the non-saturated air medium to create a double sideband parametric ultrasonic signal having a low modulation index;

e) operating the signal processor in a second predetermined signal processing mode that is distinct from the first predetermined signal processing mode when the parametric loudspeaker is operating in the saturated air medium to create a double sideband parametric ultrasonic signal having a higher modulation index than that of the first predetermined signal processing mode; and f) emitting a parametric ultrasonic wave into the air medium to produce a decoupled audio wave.

2. The method of claim 1, including the more specific step of receiving at least one complex audio input signal.

3. The method of claim 1, further comprising the step of artificially increasing the modulation index of the double sideband parametric ultrasonic signal when the parametric loudspeaker system operates in the saturated air medium.

4. The method of claim 1, further comprising the step of gradually increasing the modulation index of the double sideband parametric ultrasonic signal in a transition region between the non-saturated air medium and the saturated air medium.

5. The method of claim 3 comprising the more specific step correlating the artificial increase in the modulation index of the double sideband parametric ultrasonic signal with an increase in amplitude of the audio input signal that results in a decrease in distortion level of the decoupled audio wave.

6. A parametric loudspeaker system for operating in both a non-saturated air medium and a saturated air medium, comprising:

ultrasonic carrier and audio input signal sources for providing an ultrasonic carrier signal and an audio input signal;

a signal processor coupled to the ultrasonic carrier and audio input signal sources, operating in a first predetermined signal processing mode when the parametric loudspeaker is operating in the non-saturated air medium configurable to reduce distortion introduced in a decoupled audio wave in the non-saturated air medium, and operating in a second predetermined signal processing mode when the parametric loudspeaker is operating in the saturated air medium for creating a double sideband parametric ultrasonic signal;

wherein the first predetermined signal processing mode is configured to create a double sideband parametric ultrasonic signal having a modulation envelope that substantially matches an amplitude modulated version of a square-rooted audio input signal, and the second predetermined signal processing mode is configured to produce the double sideband parametric ultrasonic signal wherein the double sideband parametric ultrasonic signal having a modulation envelope that substantially matches an amplitude modulated version of a non-square-rooted audio input signal; and an electro-acoustical emitter coupled to the signal processor for emitting a parametric ultrasonic wave.

7. The system of claim 6, further comprising a parametric modulator coupled to the ultrasonic carrier and audio input signal sources, for parametrically modulating the ultrasonic carrier signal with the audio input signal to produce a parametric ultrasonic signal.

8. The system of claim 6, wherein the first predetermined signal processing mode is configured to create the double sideband parametric ultrasonic signal having a low modulation index, and the second predetermined signal processing mode is configured to create the double sideband parametric ultrasonic signal having a higher modulation index than that of the first predetermined signal processing mode.

9. The system of claim 8, wherein the modulation index of the double sideband parametric ultrasonic signal is artificially increased when the parametric loudspeaker system operates in the saturated air medium.

10. The system of claim 8, wherein the modulation index is gradually artificially increased in a transition region between the non-saturated air medium and the saturated air medium.

11. The system of claim 9, wherein the artificial increase of the modulation index of the double sideband parametric ultrasonic signal corresponds to an increase in amplitude of the audio input signal that results in a decrease in distortion level of the decoupled audio wave.

12. The system of claim 6, wherein the parametric modulator and the signal processor are integrated into a single device.

13. A method for operating a parametric loudspeaker system in both a non-saturated air medium and a saturated air medium, comprising:

a) receiving at least one audio input signal;

b) generating an ultrasonic carrier signal;

c) parametrically modulating the audio input signal and ultrasonic carrier signal to produce a parametric ultrasonic signal;

d) operating a signal processor in a first predetermined signal processing mode when the parametric loudspeaker is operating in the non-saturated air medium to create a double sideband parametric ultrasonic signal, wherein a modulation envelope of the double sideband parametric ultrasonic signal substantially matches an amplitude modulated version of a square-rooted audio input signal;

e) operating the signal processor in a second predetermined signal processing mode that is distinct from the first predetermined signal processing mode when the parametric loudspeaker is operating in the saturated air medium to create a double sideband parametric ultrasonic signal, wherein the modulation envelope substantially matches an amplitude modulated version of a non-square-rooted audio input signal; and f) emitting a parametric ultrasonic wave into the air medium to produce a decoupled audio wave.

14. The method of claim 13, wherein the step of operating the signal processor in the first predetermined signal processing mode further includes recursively adjusting the modulation envelope until the modulation envelope substantially matches an amplitude modulated version of a square-rooted audio input signal.

15. The method of claim 13, further comprising changing gradually from the first predetermined signal processing mode to the second predetermined signal processing mode as the parametric loudspeaker transitions from operating in the non-saturated air medium to operating in the saturated air medium.

16. A method for operating a parametric loudspeaker system in both a non-saturated air medium and a saturated air medium, comprising:

a) receiving at least one audio input signal;

b) generating an ultrasonic carrier signal;

c) parametrically modulating the audio input signal and ultrasonic carrier signal to produce a parametric ultrasonic signal;

d) operating a signal processor in a first predetermined signal processing mode when the parametric loudspeaker is operating in the non-saturated air medium to create a double sideband parametric ultrasonic signal from a preprocessed square-rooted audio input signal;

e) operating the signal processor in a second predetermined signal processing mode that is distinct from the first predetermined signal processing mode when the parametric loudspeaker is operating in the saturated air medium to create a double sideband parametric ultrasonic signal from a non-square-rooted audio input signal; and f) emitting a parametric ultrasonic wave into the air medium to produce a decoupled audio wave.

17. A parametric loudspeaker system for operating in both a non-saturated air medium and a saturated air medium, comprising:

ultrasonic carrier and audio input signal sources for providing an ultrasonic carrier signal and an audio input signal;

a signal processor coupled to the ultrasonic carrier and audio input signal sources, operating in a first predetermined signal processing mode when the parametric loudspeaker is operating in the non-saturated air medium configurable to reduce distortion introduced in a decoupled audio wave in the non-saturated air medium, and operating in a second predetermined signal processing mode when the parametric loudspeaker is operating in the saturated air medium for creating a double sideband parametric ultrasonic signal;

wherein the first predetermined signal processing mode is configured to create the double sideband parametric ultrasonic signal from a preprocessed square-rooted audio input signal, and the second predetermined signal processing mode is configured to create the double sideband parametric ultrasonic signal from a non-square-rooted audio input signal; and an electro-acoustical emitter coupled to the signal processor for emitting a parametric ultrasonic wave.

* * * * *